US00RE49498E

(19) United States
(12) Reissued Patent
Morris

(10) Patent Number: US RE49,498 E
(45) Date of Reissued Patent: Apr. 25, 2023

(54) GOLF MAT

(71) Applicant: Charles W. Morris, Charleston, SC (US)

(72) Inventor: Charles W. Morris, Charleston, SC (US)

(21) Appl. No.: 29/853,735

(22) Filed: Sep. 19, 2022

Related U.S. Patent Documents

Reissue of:
(64) Patent No.: Des. 937,951
Issued: Dec. 7, 2021
Appl. No.: 29/721,430
Filed: Jan. 21, 2020

(51) LOC (14) Cl. ..... 21-02
(52) U.S. Cl.
USPC ..... D21/792
(58) Field of Classification Search
USPC ..... D21/789, 791, 792; D10/71; D14/491
CPC ..... A63B 69/3664; A63B 69/3623; A63B 69/3608; A63B 69/3658; A63B 69/3676; A63B 69/3661; A63B 69/3697; A63B 69/36; A63B 69/3667; A63B 69/3685; A63B 69/3614; A63B 69/3691
See application file for complete search history.

(56) References Cited

U.S. PATENT DOCUMENTS 1,944,696 A 1/1934 Reichl
3,523,689 A 8/1970 Cornell et al.
3,743,136 A 7/1973 Chambers
3,892,412 A 7/1975 Koo
3,936,055 A 2/1976 Scott
D249,077 S * 8/1978 Friskel ..... D19/59
D275,413 S * 9/1984 Shroads ..... D21/792
4,779,796 A * 10/1988 Lai ..... A63B 69/3652 473/279
4,988,106 A 1/1991 Coonrod
D328,937 S * 8/1992 Becella ..... D21/792
5,340,111 A * 8/1994 Froelich ..... A63B 69/3652 108/7
D359,336 S * 6/1995 DeLapp ..... D21/792
5,445,380 A 8/1995 Polsky
5,470,074 A * 11/1995 Hotchkiss ..... A63B 69/3652 473/279
5,645,494 A 7/1997 Thomas et al.
6,001,026 A * 12/1999 Breneman ..... A63B 69/3623 473/261
6,312,345 B1 11/2001 Pelz
(Continued)

*Primary Examiner* — Philip S Hyder
(74) *Attorney, Agent, or Firm* — Nelson Mullins Riley & Scarborough LLP

(57) CLAIM

The ornamental design for a golf mat, substantially as shown and described.

DESCRIPTION

FIG. 1 is a perspective view of a new, original, and ornamental design of a golf mat in accordance with the present invention;
FIG. 2 is a top side plan view of the design of FIG. 1;
FIG. 3 is a bottom side plan view of the design of FIG. 1;
FIG. 4 is a left side elevation view of the design of FIG. 1;
FIG. 5 is a right side elevation view of the design of FIG. 1;
FIG. 6 is a front side elevation view of the design of FIG. 1; and,
FIG. 7 is a rear side elevation view of the design of FIG. 1.
The portions shown in broken lines in the Figures form no part of the claimed design.

1 Claim, 5 Drawing Sheets

Figure 4:
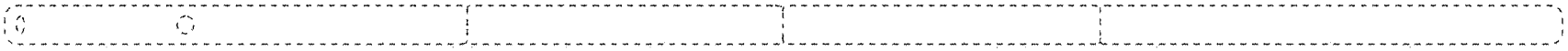
Figure 5:
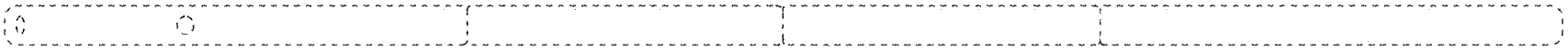
Figure 6:
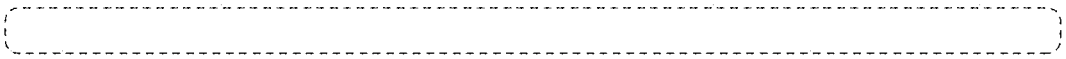
Figure 7:
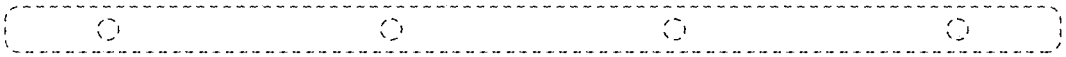

Matter enclosed in heavy brackets [ ] appears in the original patent but forms no part of this reissue; matter printed in italics indicates the additions made by reissue.

[AMENDED]

(56) References Cited

U.S. PATENT DOCUMENTS

D501,239 S * 1/2005 Bodor ..... D21/792
D502,241 S * 2/2005 Nevill ..... D21/791
D509,276 S 9/2005 Sear
D509,873 S * 9/2005 Dias ..... D21/792
D521,096 S * 5/2006 Pelz ..... D21/792
D537,141 S * 2/2007 Peterson ..... D21/791
D545,934 S * 7/2007 Hardy, Jr. ..... D21/798
D596,260 S * 7/2009 Hall, Sr. ..... D21/792
D602,040 S * 10/2009 Matsuguma ..... A63B 69/3661 D14/491
D607,076 S * 12/2009 Hadley ..... D21/791
7,699,715 B2 4/2010 McFarlin et al.
D653,719 S * 2/2012 Palonis ..... D21/792
8,221,256 B2 7/2012 Broering
8,282,502 B1 * 10/2012 Angstead ..... A63B 69/3661 473/278
8,702,528 B1 4/2014 Montgomery
D705,807 S * 5/2014 Tursi ..... D14/491
D716,892 S * 11/2014 Schlosser ..... D21/792
D727,449 S 4/2015 Sun
D729,273 S * 5/2015 Mariet ..... A63B 69/3667 D14/491
D731,610 S * 6/2015 Marcy ..... D21/792
D777,864 S * 1/2017 Shirakawa ..... D21/791
D803,872 S * 11/2017 Cole ..... D14/491
D828,472 S * 9/2018 Alcantara ..... D21/792
D855,723 S * 8/2019 Sjostrom ..... D21/791
D860,366 S * 9/2019 Bailey ..... D21/792
D937,951 S 12/2021 Morris
2005/0227774 A1 * 10/2005 Buck ..... A63B 69/3667 473/270
2007/0042829 A1 2/2007 Dennesen
2007/0191128 A1 8/2007 Tirol
2013/0337928 A1 * 12/2013 Scott ..... A63B 69/3661 473/218
2016/0067580 A1 3/2016 Viera
2018/0200596 A1 7/2018 Shill
2022/0054921 A1 * 2/2022 Morris ..... A63B 69/3661

* cited by examiner

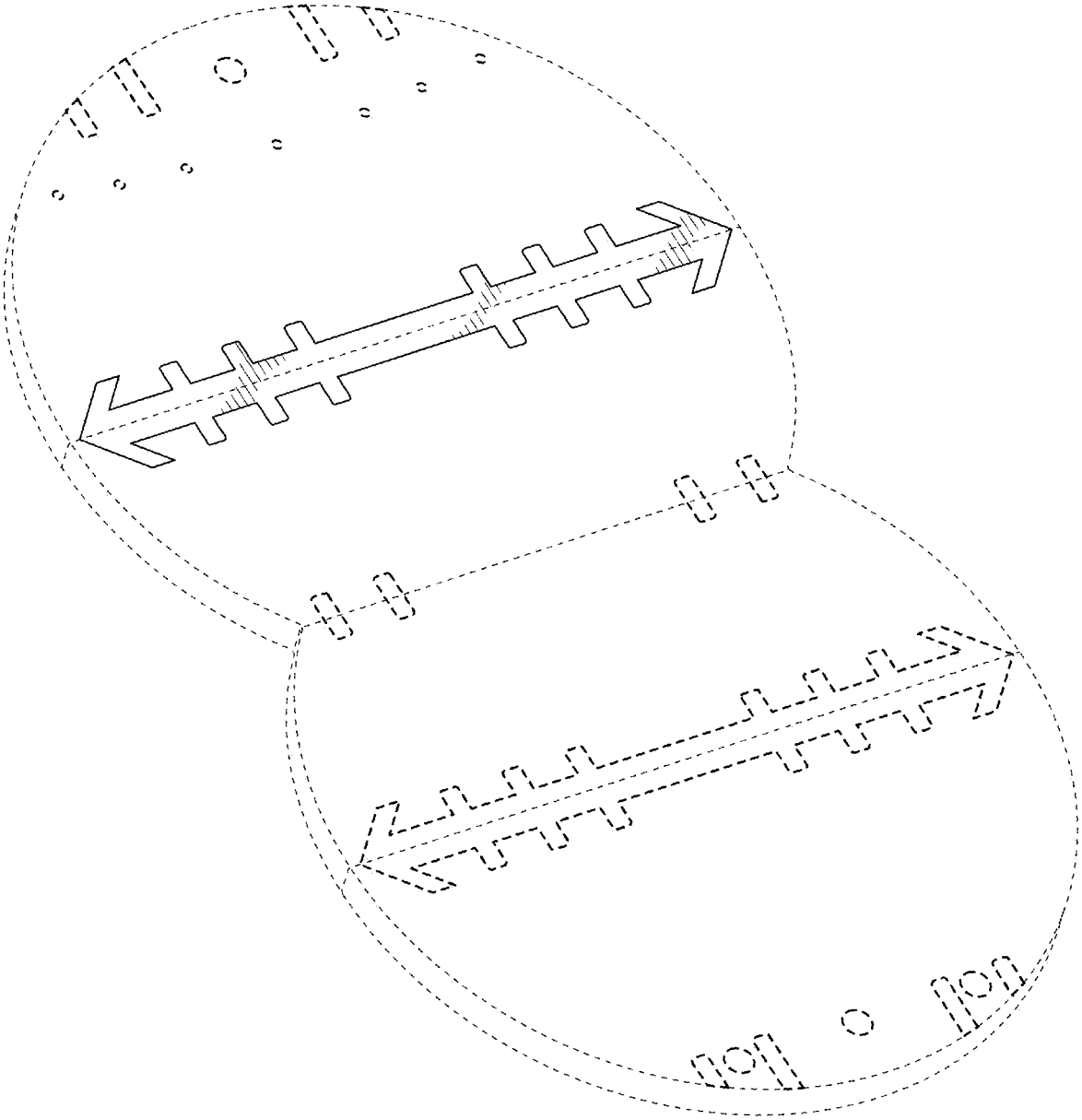
FIG. 1
[AMENDED]

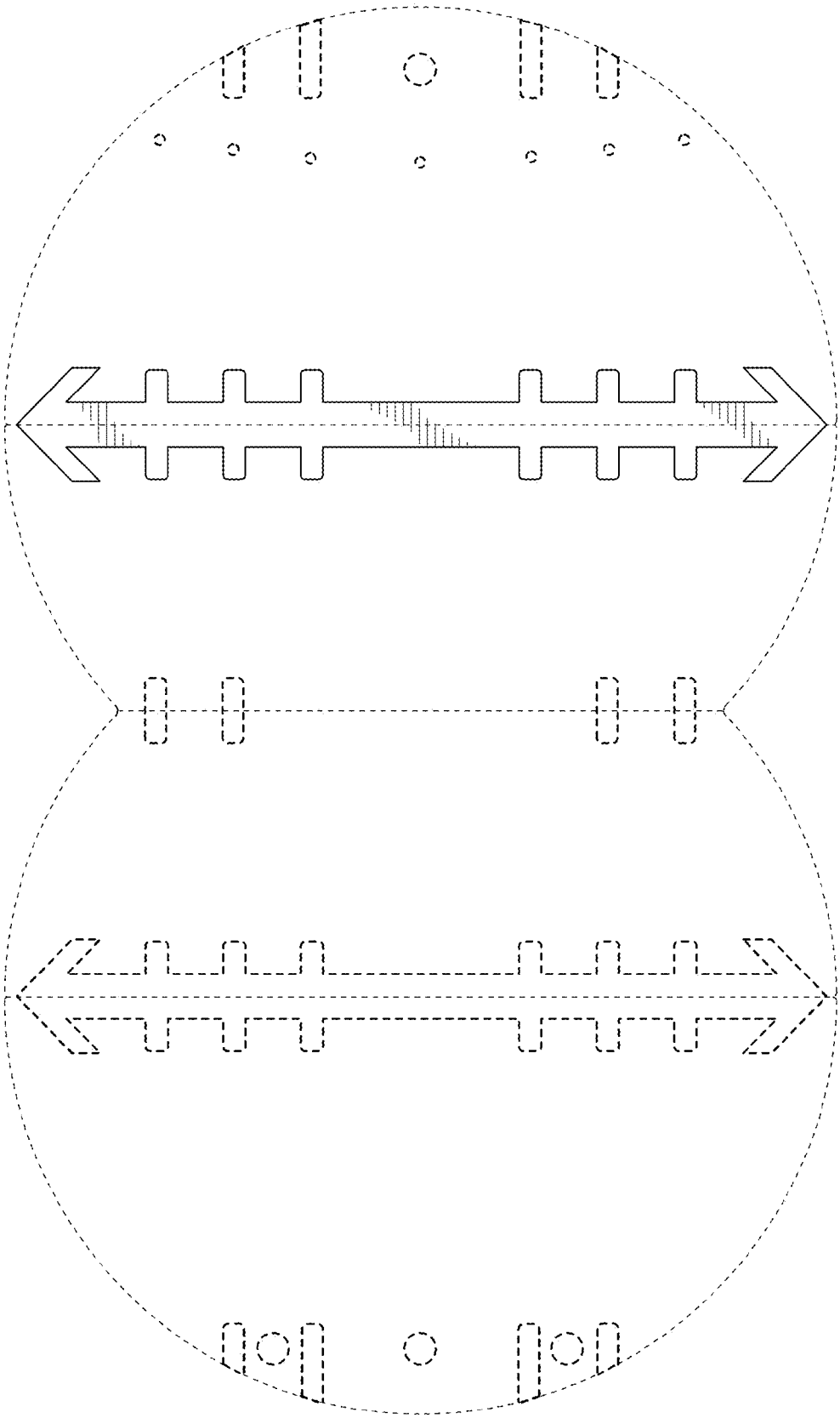
FIG. 2
[AMENDED]

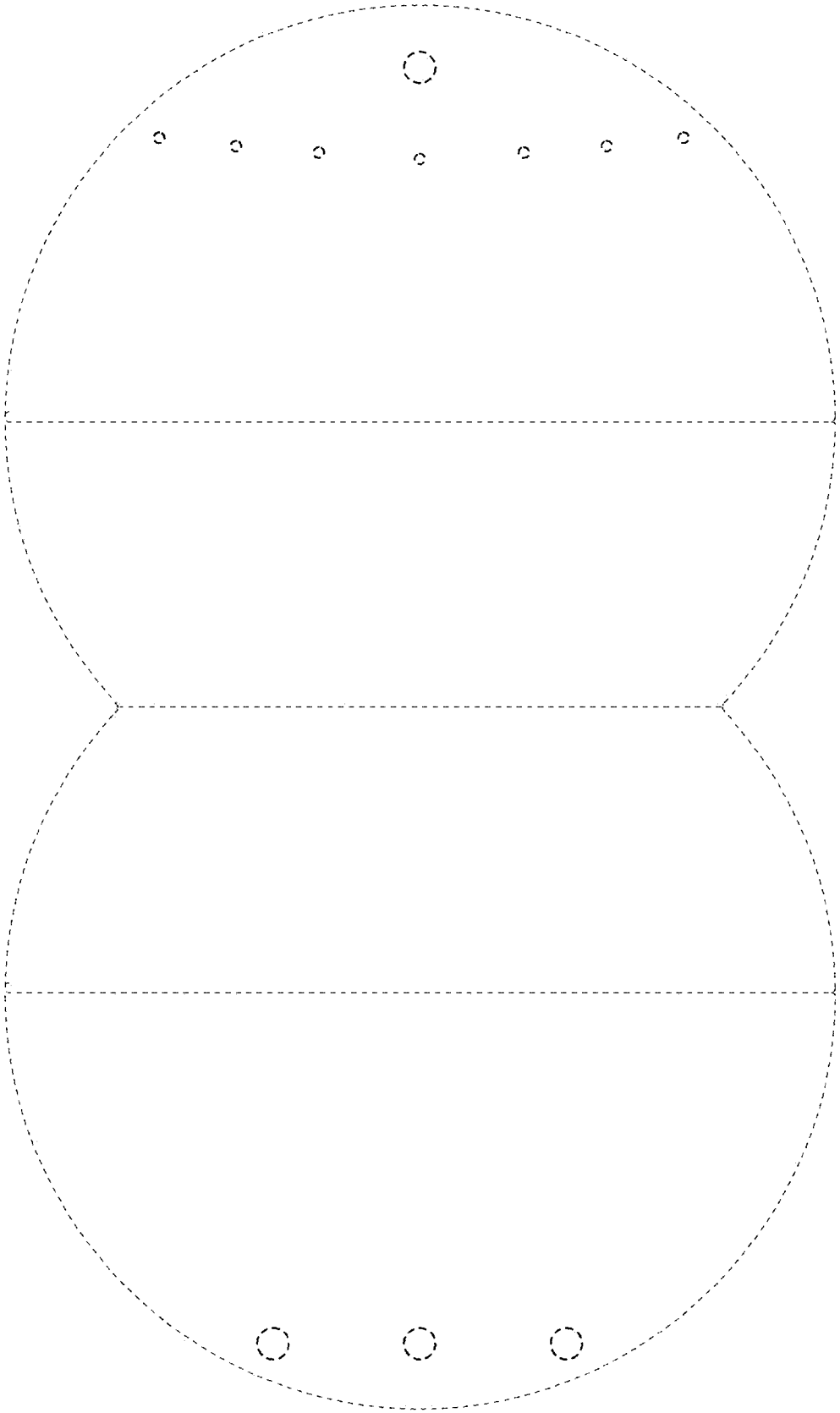
FIG. 3
[AMENDED]